United States Patent
Mathai et al.

(10) Patent No.: US 11,391,898 B2
(45) Date of Patent: Jul. 19, 2022

(54) DIRECT OPTO-MECHANICAL CONNECTION FOR PLUGGABLE OPTICAL TRANSCEIVERS

(71) Applicant: HEWLETT PACKARD ENTERPRISE DEVELOPMENT LP, Houston, TX (US)

(72) Inventors: Sagi Varghese Mathai, Palo Alto, CA (US); Paul Kessler Rosenberg, Palo Alto, CA (US); Michael Renne Ty Tan, Palo Alto, CA (US); Kevin B. Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/900,757

(22) Filed: Jun. 12, 2020

(65) Prior Publication Data
US 2021/0389533 A1    Dec. 16, 2021

(51) Int. Cl.
*H04B 10/00* (2013.01)
*G02B 6/42* (2006.01)
*H04B 10/40* (2013.01)

(52) U.S. Cl.
CPC .......... *G02B 6/4261* (2013.01); *H04B 10/40* (2013.01)

(58) Field of Classification Search
CPC combination set(s) only.
See application file for complete search history.

(56) References Cited

U.S. PATENT DOCUMENTS

| | | |
|---|---|---|
| 5,943,461 A | 8/1999 | Shahid |
| 6,821,027 B2 | 11/2004 | Lee et al. |
| 6,934,450 B2 | 8/2005 | Hiramatsu |
| 7,021,833 B2 | 4/2006 | Loh et al. |
| 7,785,020 B2 | 8/2010 | Kim et al. |
| 7,941,053 B2 | 5/2011 | Dallesasse |
| 8,483,571 B2 | 7/2013 | McColloch et al. |
| 8,485,738 B2 | 7/2013 | Rosenberg et al. |

(Continued)

FOREIGN PATENT DOCUMENTS

DE    3630382    3/1988

*Primary Examiner* — Agustin Bello
(74) *Attorney, Agent, or Firm* — Sheppard Mullin Richter & Hampton LLP

(57) ABSTRACT

Pluggable optical transceiver modules are described herein that are specifically configured to preclude use of fiber jumpers inside of the module. The pluggable optical transceiver modules include an on-board application-specific integrated circuit (ASIC), optical transceiver, and an optical socket allowing a fiber to connect to the optical transceiver. Pluggable optical transceiver modules implement an opto-mechanical interface between an external fiber cable (attached to the pluggable optical transceiver module) and the optical transceiver in manner that does not require the fiber jumper, while ensuring tight alignment tolerances. In some embodiments, optical transceiver modules are designed to achieve a direct opt-mechanical coupling between the external fiber cable and on-board opto-electrical components (e.g., optical transceiver). For example, an adaptor is distinctly designed, directly connecting an external cable to the optical socket (eliminating the use of fiber jumper and faceplate connector in the module). In some embodiments, a rigid body opto-mechanical interface is used.

13 Claims, 11 Drawing Sheets

(56) References Cited

U.S. PATENT DOCUMENTS

| | | |
|---|---|---|
| 8,529,140 B2 | 9/2013 | McColloch |
| 8,588,561 B2 | 11/2013 | Zbinden et al. |
| 8,641,299 B2 | 2/2014 | Daikuhara et al. |
| 8,926,199 B1 | 1/2015 | Chan et al. |
| 8,961,037 B2 | 2/2015 | Nishimura |
| 9,279,943 B1 | 3/2016 | McColloch |
| 9,363,020 B2 | 6/2016 | Kurashima |
| 9,383,519 B2 | 7/2016 | Yi |
| 9,389,374 B2 | 7/2016 | Ertel |
| 9,553,671 B1 | 1/2017 | Nagarajan et al. |
| 9,612,405 B2 | 4/2017 | Aoki et al. |
| 9,671,580 B1 | 6/2017 | Nagarajan et al. |
| 9,671,581 B2 | 6/2017 | Nagarajan et al. |
| 9,739,944 B1 | 8/2017 | Fermor |
| 9,778,420 B2 | 10/2017 | Shimizu et al. |
| 9,798,087 B1 * | 10/2017 | Mathai ............... G02B 6/4215 |
| 9,880,366 B2 | 1/2018 | Vallance et al. |
| 10,025,043 B2 * | 7/2018 | Vallance ............. G02B 6/4225 |
| 10,175,431 B2 | 1/2019 | Lin et al. |
| 10,191,221 B1 | 1/2019 | Leigh et al. |
| 10,241,275 B2 | 3/2019 | Li et al. |
| 10,295,763 B2 | 5/2019 | Ho et al. |
| 10,466,432 B2 | 11/2019 | Luo et al. |
| 10,466,433 B2 | 11/2019 | Epitaux et al. |
| 10,520,680 B2 | 12/2019 | Li et al. |
| 10,680,736 B2 | 6/2020 | Li et al. |
| 10,754,108 B2 | 8/2020 | Matsuoka et al. |
| 10,795,103 B2 | 10/2020 | Rosenberg et al. |
| 10,877,232 B1 | 12/2020 | Bailey et al. |
| 10,897,122 B2 | 1/2021 | Mathai et al. |
| 2006/0274997 A1 | 12/2006 | Furuno et al. |
| 2006/0291782 A1 | 12/2006 | Carpenter et al. |
| 2007/0183724 A1 | 8/2007 | Sato |
| 2008/0044141 A1 | 2/2008 | Willis et al. |
| 2008/0226228 A1 | 9/2008 | Tamura et al. |
| 2009/0226181 A1 | 9/2009 | Fingler et al. |
| 2009/0310907 A1 | 12/2009 | Ikeda et al. |
| 2010/0135618 A1 | 6/2010 | Howard et al. |
| 2011/0123151 A1 | 5/2011 | Zbinden et al. |
| 2012/0213475 A1 | 8/2012 | Selli et al. |
| 2013/0294730 A1 | 11/2013 | Leigh et al. |
| 2014/0064676 A1 | 3/2014 | McColloch |
| 2014/0193160 A1 * | 7/2014 | Yagisawa ............ G02B 6/4284 398/136 |
| 2014/0248057 A1 | 9/2014 | Li et al. |
| 2015/0338585 A1 | 11/2015 | Li et al. |
| 2016/0091684 A1 | 3/2016 | Van et al. |
| 2016/0192044 A1 | 6/2016 | Raza et al. |
| 2017/0212320 A1 | 7/2017 | Hara |
| 2017/0261701 A1 | 9/2017 | Izawa |
| 2018/0225487 A1 | 8/2018 | Leigh et al. |
| 2018/0299632 A1 | 10/2018 | Van et al. |
| 2020/0081208 A1 | 3/2020 | Leigh et al. |
| 2020/0150364 A1 * | 5/2020 | Leigh .................. G02B 6/4284 |
| 2020/0158969 A1 | 5/2020 | Leigh et al. |
| 2020/0166718 A1 | 5/2020 | Takeuchi et al. |
| 2020/0192035 A1 | 6/2020 | Leigh et al. |
| 2020/0341219 A1 | 10/2020 | Zhou et al. |

* cited by examiner

DIRECT OPTO-MECHANICAL CONNECTION FOR PLUGGABLE OPTICAL TRANSCEIVERS

BACKGROUND

Optical communication technology is used in some computing networks to increase speed, cable length and overall bandwidth for communication between different networking devices (e.g., server device to a network router, among network switches). The optical signals received at the faceplate by such devices are generally converted into electrical signals at the system interface side and routed through the networking device over electrical connectors and traces. Conversely, optical signals can be transmitted by the networking device. For example, electrical signals can be converted into optical signals which are transmitted from the system interface side of the networking device. Optical components are increasingly being integrated into networking devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

Figure 1A:
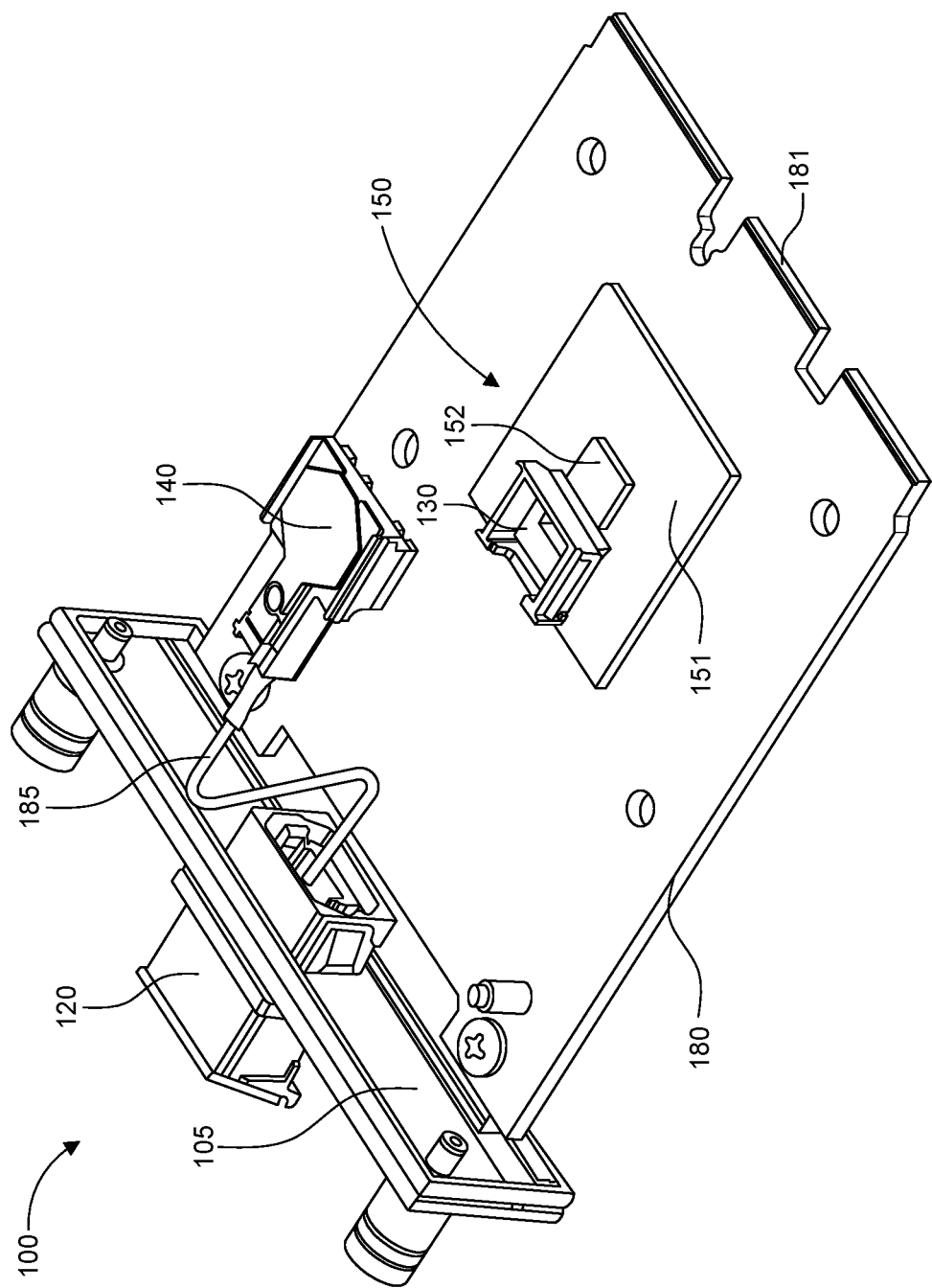
FIG. 1A illustrates an example of a pluggable optical transceiver module, in accordance with an embodiment of the technology disclosed herein.

The figures are not exhaustive and do not limit the present disclosure to the precise form disclosed.

DETAILED DESCRIPTION

To improve efficiency and throughput, optics are increasingly being integrated within system devices. Pluggable modules (e.g., quad small form-factor pluggable (QSFP) modules) in the form of optical transceivers provide a conversion point between electrical and optical signals on the system device's faceplate. However, such optical transceiver pluggable modules are generally inefficient in cost, electrical signal integrity, thermal management, module management, printed circuit board (PCB) area utilization, faceplate area utilization, and optical cable management. For instance, moving the optical transceivers closer to processing components within system devices can reduce the distance of electrical traces linking the optical transceiver and the processing component, thereby increasing system performance and signal integrity. However, being able to achieve an efficient and compact design is thwarted in some standard pluggable modules, as a fiber jumper is typically used to connect the optical transceiver to the faceplate connectors. For instance, some pluggable modules used in the industry employ a faceplate optical connector (e.g., multi-fiber push on (MPO)) and a chip optical connector to connect to the optical transceiver chip (via an optical socket). In order to address distance caused by a physical separation between the MPO connector and the chip optical connector in the module, a fiber jumper is commonly used. Nonetheless, this additional interface from the fiber jumper is associated with drawbacks, such as optical loss (due to fiber bends and potential inconsistent multiple fibers terminated at the chip optical connector and faceplate optical connectors), space inefficiencies (due to limited minimum distance between a chip optical connector and a faceplate to accommodate long enough fiber lengths to terminate to chip optical connector and faceplate optical connectors), and cost increases (due to difficulties to terminate short fibers). The pluggable modules described herein are designed to mitigate these problems. Different examples of pluggable optical transceiver modules implementing an opto-mechanical interface (e.g., via a direct connection or via an additional interface) between an external fiber cable and the optical transceiver in manner that does not require use of a fiber jumper, are disclosed herein, while ensuring that the alignment tolerances between opto-mechanical elements are tight enough to properly align optical signals. In some embodiments, optical transceiver modules are designed to achieve a direct opt-mechanical coupling between the external fiber cable and board-end opto-electronic components (e.g., optical transceiver) in the module.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Referring now to FIG. 1A an example of a pluggable optical transceiver module 100 is depicted. As shown, the pluggable optical transceiver module 100 is configured as a horizontally flat and rigid board 180, such as a printed circuit board (PCB), which can be considered as the bottom plane of the module 100. The board 180 has a faceplate 105 attached substantially orthogonally thereto at an end surface, forming a generally "L" shape. This allows for the faceplate 105 to serve as a form of termination point, creating a barrier between external components (outside of the module 100), such as an external optical cable, that may be part of a system which is connected to the module 100, and the internal components of the module 100 itself.

The pluggable optical transceiver module 100 also includes an application-specific integrated circuit (ASIC) 152 that is mounted to a top surface of a chip substrate 151. The chip substrate 151 is further mounted to the module board 180. Additionally, a chip optical connector 140 is shown. In the illustrated example, an optical socket 130 is also mounted onto the chip substrate 151, proximate to the ASIC 152. The optical socket 130 surrounds the opto-electronics disposed on the chip substrate 151. The chip substrate 151 encompasses opto-electronics for converting optical signals into electronic signals (and vice versa) and ASIC 152 to transmit/receive electrical signals between the opto-electronics and system interface 181. The system interface 181 may comprise high-speed electrical signals, low-speed management electrical signals and electrical power connections to a system.

The chip optical connector 140 has integrated micro-optics, such as mirrors, lenses, optical multiplexer/demultiplexer, and wavelength filters. The chip substrate 151 has opto-electronics, such as VCSEL (vertical cavity surface emitting lasers), PD (photodetectors), and lenses. When the chip optical connector 140 is connected to the optical socket 130, these aforementioned micro-optics in the chip optical connector 140 and opto-electronics within the optical socket 130 on the chip substrate 151 operate together to impart CWDM (coarse wave-division multiplexing) optical transceiver capabilities. In other words, when the chip optical connector 140 is seated inside the optical socket 130, the integrated micro-optics of the chip optical connector 140 and the opto-electronics of the optical socket 130 are aligned in a manner that allows multi-wavelength light signals to be coupled between them, ultimately implementing the CWDM optical transceiver capabilities. These micro-optics within the chip optical connector 140 and opto-electronics within the optical socket 130, which form the CWDM optical transceiver 150 are discussed in greater detail in reference to FIG. 1B. As background, a photonic modulator may electronically modulate a carrier light provided by a laser to convey information over an optical channel, converting electrical signals to optical signals on a transmit channel. A modulator is normally accompanied by a demodulator. A demodulator (e.g., a photodetector) converts detected light signals to electrical signals. A modulator and a demodulator together form an optical transceiver. Similarly, the CWDM optical transceiver 150 can convey information over an optical channel (e.g., transmit and receive optical signals).

Referring now to the faceplate 105 of the pluggable optical transceiver module 100, a faceplate connector receptacle 120 is illustrated as being inserted through an aperture in the faceplate's 105 surface. The faceplate connector receptacle 120 is a receptacle into which an external MPO connector (not shown) and an MPO terminated internal fiber jumper 185 may be plugged to enable precise optical coupling between the external fiber optic cable and the internal fiber optic jumper. In order for an optical connection to be established between the faceplate connector receptacle 120 and the optical socket 130, a short fiber jumper 185 terminated with an MPO connector is run from the faceplate connector receptacle 120 and terminated at the chip optical connector 140. That is, there is a short distance between the faceplate connector receptacle 120 (disposed at the faceplate 105) and the optical socket 130 (farther away from the faceplate 105) that must be traversed in order for the chip optical connector 140 to interface with both the faceplate connector receptacle 120 and the optical socket 130. Although substantially short in length, this distance must be accounted for, in order for the optical connection to be appropriately established. Consequently, use of the fiber jumper 185 is required in this configuration of the pluggable optical transceiver module's 100 configuration.

As an example, the pluggable optical transceiver module 100 may be installed in a system, such as a server blade or network switch. Continuing with the example of a network switch, the pluggable transceiver module 100 can be inserted, or "plugged", into the network switch, for example plugging the module 100 into a bay that is suitable for receiving and/or interacting with the module 100 (based on the dimensions, configuration, and capabilities of the module 100). After insertion, the faceplate 105 terminates one end of the pluggable optical transceiver module 100 at an external surface of the network switch, while the other end of the module 100 (including the CWDM optical transceiver 150) is housed within the network switch. Generally speaking, any elements outside of the faceplate 105 (e.g., to the left of the faceplate 105 in FIG. 1A), can be considered external to the pluggable optical transceiver module 100, and any elements inside of the faceplate 105 (e.g., to the right of the faceplate 105 in FIG. 1A) can be considered internal to the module 100. Referring again to the example, the switch can be inside of an enclosure that includes additional switches and multiple optical connectors for receiving inter-switch links, such as external optical cables. These optical connectors can be implemented as any optical connector deemed appropriate for optical coupling of optical switches. Accordingly, an external optical cable can be used for connecting the switch, having the pluggable optical transceiver module 100 installed therein, to another switch by connecting this external cable to faceplate connector receptacle 120. It should be appreciated that the abovementioned example is for purposes of discussion, and not intended to be limiting. To this end, the pluggable optical transceiver module 100 and other configurations described herein can be used in various other system configurations, for instance with leaf switch line-cards, which are modular electronic circuits (disposed on PCB) designed to fit within a bay or other connector of a larger PCB (e.g., a motherboard of a core switch).

In some embodiments, the faceplate connector receptacle 120 is implemented to accept a MPO connector. MPO connectors are fiber connectors comprised of multiple optical fibers. While defined as an array connector having more than 2 fibers, MPO connectors are typically available with 8, 12 or 24 fibers for common data center LAN (local area network) applications.

Figure 1B:
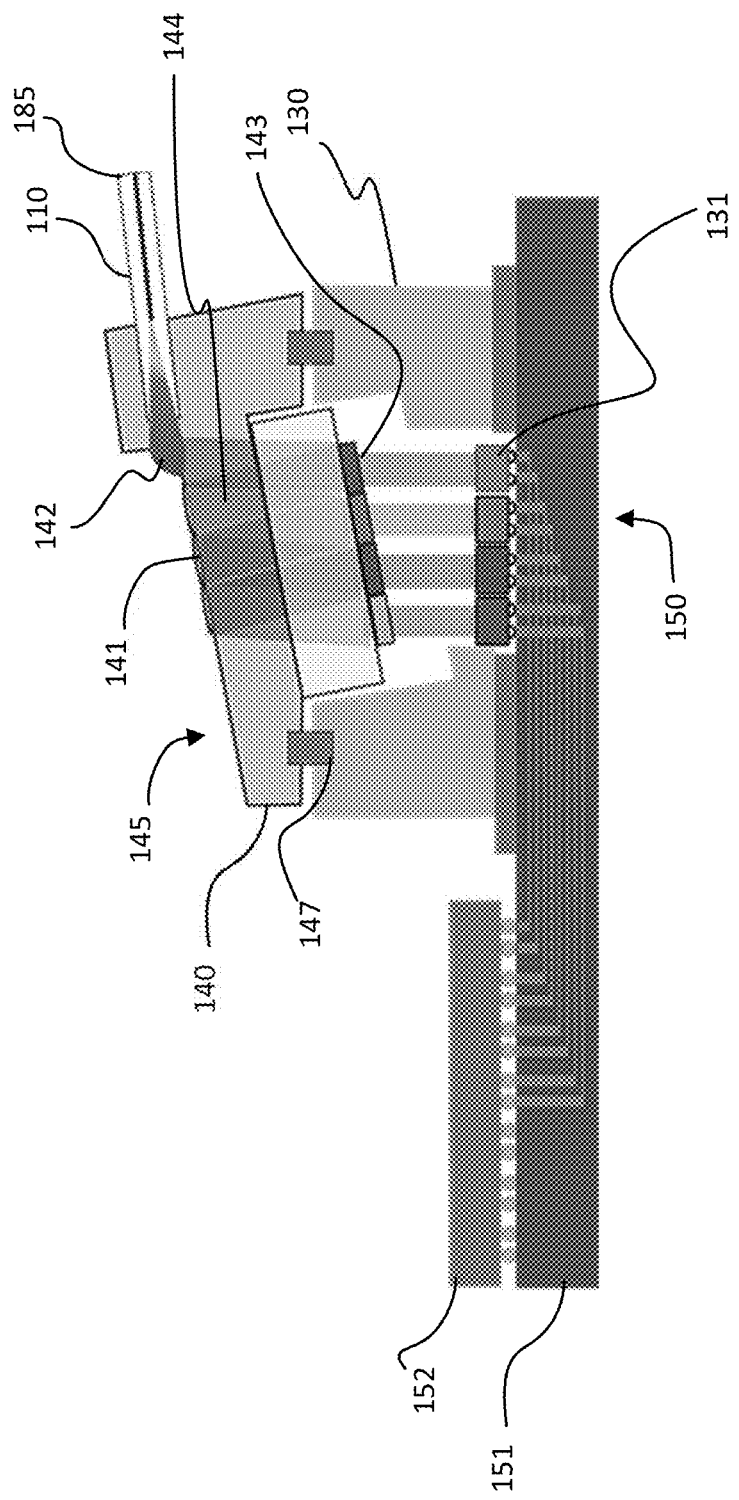
FIG. 1B illustrates an example of a CWDM optical transceiver that may be integrated into the pluggable optical transceiver module shown in FIG. 1A, in accordance with an embodiment of the technology disclosed herein.

Referring now to FIG. 1B, an example of the CWDM optical transceiver 150 that can be integrated into the pluggable optical transceiver module (shown in FIG. 1A) is more prominently shown. The CWDM optical transceiver 150 can have an integrated circuit (IC) chip 152, such as an ASIC, coupled to a chip substrate 151. The ASIC 152 may be a transceiver device, a computing device, an accelerator device, a storage device, a memory device, etc. The chip optical connector 140 may be an optical connector consisting of micro-optics. A set of micro-optics that are integrated in the chip optical connector 140 may include, but are not limited to: an injection molded ferrule 145 (that further comprises relay mirrors 141, a turning lens 142, and an optical zig-zag multiplexer/demultiplexer (mux/demux) 144) and a CWDM monolithic wavelength filter block 143. The chip optical connector 140 can also include various mechanical components, such as alignment features 147 that allow the chip optical connector 140 to be properly aligned and seated to the optical socket 130, thereby ensuring that the micro-optics of the chip optical connector 140 and the opto-electronics within the optical socket 130 are suitably aligned for the CWDM optical transceiver 150 to function. Additionally, the injection molded ferrule 145 comprises optical fiber terminating features for optical fibers 110 of a jumper 185.

Referring to the CWDM optical transceiver 150, there are additional opto-electronics, namely VCSEL (vertical cavity surface emitting laser) arrays 131 that may act as a light source. For example, light from the VCSEL arrays 131 can be emitted at multiple wavelengths and ultimately traverse the optical zig-zag multiplexer/demultiplexer 144 in the chip optical connector 140 before being directed to ingress into the fiber jumper 110 for transmission. During an operation, the CWDM optical transceiver 150 may use a VCSEL as a light transmitting element and a photodetector (PD) as a light receiving element. Each VCSEL may be modulated by an electrical signal to produce a light signal with a carrier having a specific wavelength or wavelength range, and each photodetector may detect a light signal within a range of wavelengths.

As a general description, mating the chip optical connector 140 with the optical socket 130 enables function of the abovementioned components of the CWDM optical transceiver 150. For example, a light signal ingress to the fiber jumper 185 (e.g., transmit) may be for the optical signals emitted by the array of VCSELs 131, and a light egress from the fiber jumper 185 (e.g., receive) may be for the optical signals received by the array of PDs (not shown in FIG. 1B). A sequence of deflecting mirrors and wavelength filters may be needed to multiplex (or combine) the transmitted light signals by an array of VCSELs 131. Similarly, a sequence of deflecting mirrors and wavelength filters may be needed to demultiplex (or separate) the received light signals by the array of PDs (not shown in FIG. 1B). Although the embodiments are discussed in the context of CWDM, it should be appreciated that the pluggable optical transceiver modules disclosed herein can be implemented in accordance with other optical signaling technologies, such as wave division multiplexing (WDM), as deemed appropriate.

Referring back to FIG. 1A, the configuration of the pluggable optical transceiver module 100 is useful in many existing optical transmission systems. However, the use of the fiber jumper 185 may be associated with some drawbacks that can impact performance and efficiency of the optical transceiver 150. For instance, the fiber jumper 185 adds another interface (e.g., interface at the MPO connector side), which can potentially experience optical loss. Moreover, the fiber jumper 185 has an associated cost, which can further increase expenses in large-scale systems where the number of fiber jumpers used can be significantly higher. Even further, with the distance between the faceplate connector receptacle 120, which extends from the surface of the faceplate 105, and the optical socket 130 being substantially small, the fiber jumper 185 may have tight bend radii to fit within a small confined space and may introduce optical power losses due to tight fiber bends. Thus, the fiber jumper 185 has to be a certain length, preferably the same as the distance from the optical socket 130 to the faceplate connector receptacle 120.

Accordingly, disclosed herein are different configurations for pluggable optical transceiver modules that either adapts or eliminates the need for the fiber jumper. Generally, FIGS. 2-4 depict examples of pluggable optical transceiver modules implementing a direct opt-mechanical connection from an external optical fiber cable to the CWDM optical transceiver 150.

Figure 2:
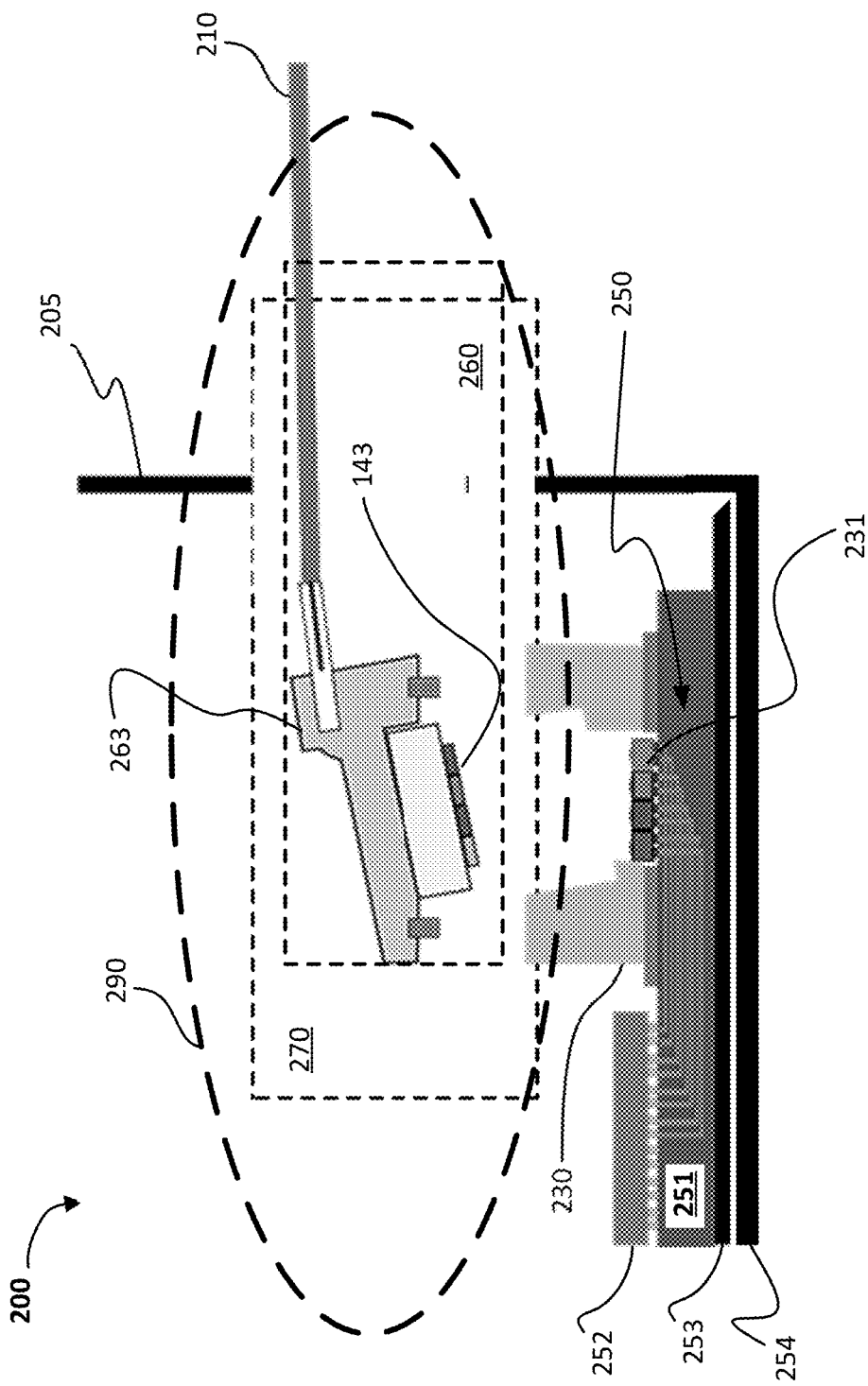
FIG. 2 illustrates an example of a pluggable optical transceiver module including an adaptor for a direct opto-mechanical connection to an optical socket, in accordance with an embodiment of the technology disclosed herein.

Referring to FIG. 2, an example of a pluggable optical transceiver module 200 including an adaptor 290 (represented by dashed oval) enabling a direct opto-mechanical connection from an external fiber 210 (which may be an array of fibers) to the optical CWDM optical transceiver 250. Generally, the adaptor 290 eliminates the faceplate connector receptacle (e.g., MPO connector receptacle) in the other configuration of the module shown in FIG. 1A. That is, the external fiber 210 terminates at the portion of the adaptor 290 having the optical plug connector 263 functionality. According to the embodiments, the optical plug connector 263 can have integrated micro-optics, such as mirrors, lenses, optical multiplexer/demultiplexer, and wavelength filters as described above (in reference to the chip optical connector in FIG. 1B). Further, the adaptor 290 is configured to seat directly to the optical socket 230 in a manner that allows the optical plug connector 263 to be stably coupled to the optical socket 230, thereby facilitating the direct opto-mechanical connection between the external fiber 210 and the CWDM optical transceiver 250. Use of the adaptor 290 can improve link budget by eliminating loss associated with additional optical connector interface present in previous configurations of the module, namely loss related to the fiber jumper interfaces.

The adaptor 290 can be described as having two principal components that can be attached, or otherwise integrated, to each other in a modular fashion. These components are shown as the receptacle assembly 270 (represented by outer dashed box), and the plug assembly 260 (represented by the inner dashed box). The plug assembly 260 houses the portion of the adaptor 290 that functions as an optical plug connector 263. Whereas, the receptacle assembly 270 is a receptacle which receives the plug assembly 260.

As alluded to above, the adaptor 290, and particularly the receptacle assembly 270 is designed to replace the previously used fiber jumper 185 by allowing the external fiber 210 terminated with optical plug connector 263 to be inserted into an aperture of the faceplate 205. Then, the plug assembly 260 acts as a mechanism to allow the optical plug connector 263 to properly seat into the optical socket 230.

This creates a direct interface towards the opto-electronics of the CWDM optical transceiver 250 that are sitting on the transceiver board 251 (or substrate) such as the VCSELs 231 and the PDs (not shown). These features of the adaptor 290 ultimately allow the external fiber 210 to efficiently couple to the optical socket 230, and completely replaces the function of the fiber jumper 185. Thus, there is no fiber jumper 185 present in this configuration of the pluggable optical transceiver module 200.

It should be appreciated that the portion of the adaptor 290 having optical plug connector 263 functionality is not necessarily configured as a conventional chip optical connector. However, optical plug connector 263 at least includes the functionality of a chip optical connector which is needed for properly mating to the optical socket 230 and includes the micro-optics needed to realize the optical transceiver capabilities.

In some cases, the optical socket 230 is also modified to protect the opto-electronics contained therein. For example, a permanent cover constructed from a rigid material (e.g., plastic, or glass) may be attached to the optical socket 230 (rather than the ferrule). Filter arrays may be mounted on a glass carrier, and the glass carrier may be attached to the optical socket 230 (rather than the ferrule). To account for these adaptations to the optical socket 230, a retention force between the optical socket 230 and the transceiver board 251 may need to be increased.

As disclosed, the arrangement of the pluggable optical transceiver module 200 is an enhancement over previous designs (shown in FIG. 1A) relying on the fiber jumper. For example, due to the fiber jumper being removed from the design of the module 200, the opto-electronics of the CWDM optical transceiver 250 can potentially be closer to the faceplate 205, thereby saving space on the module's board.

Figure 3A:
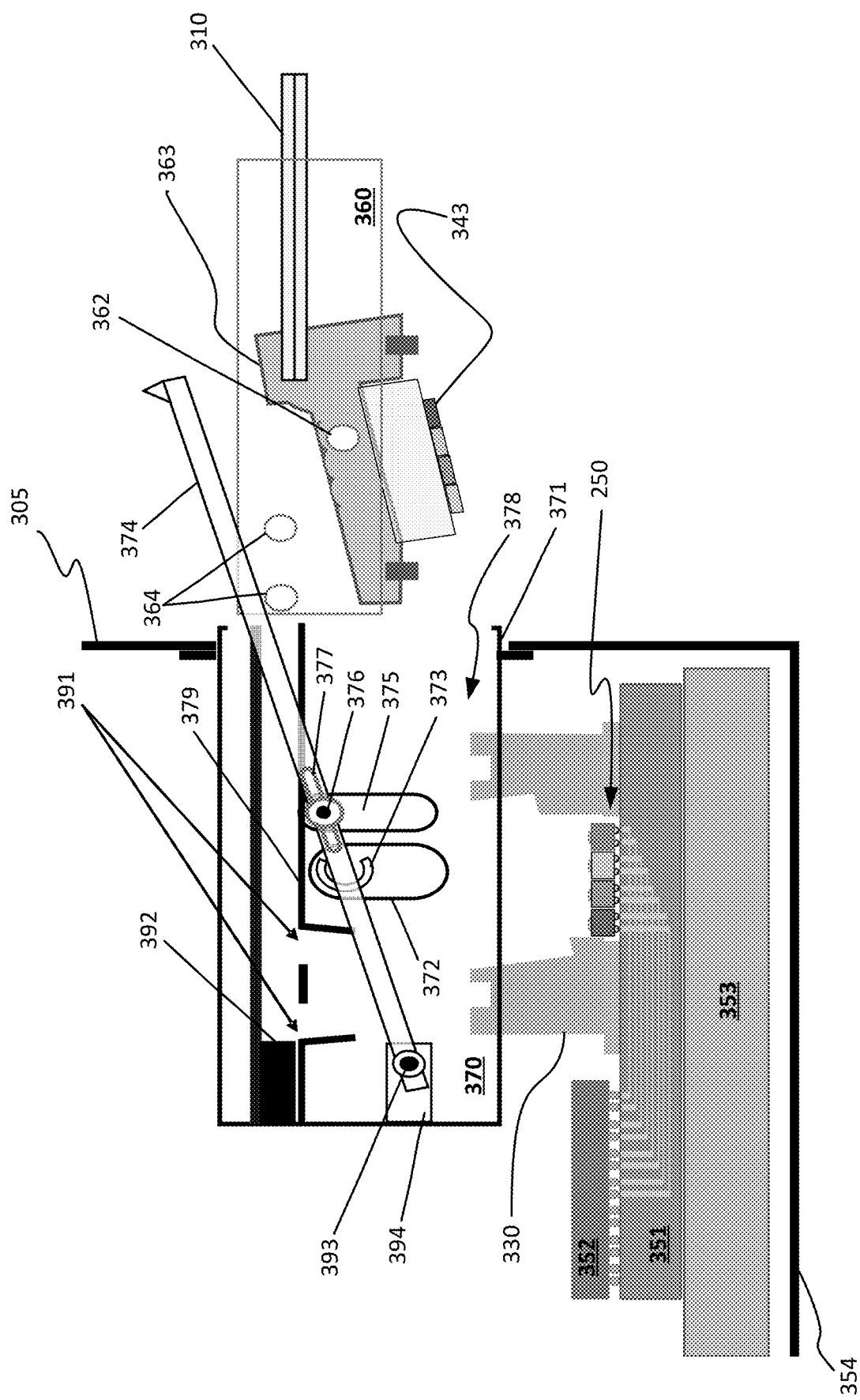
FIG. 3A illustrates another example of a pluggable optical transceiver module including an example configuration for the adaptor shown in FIG. 2 that includes a plug assembly and a receptacle assembly for a direct opto-mechanical connection to an optical socket, in accordance with an embodiment of the technology disclosed herein.
Figure 3B:
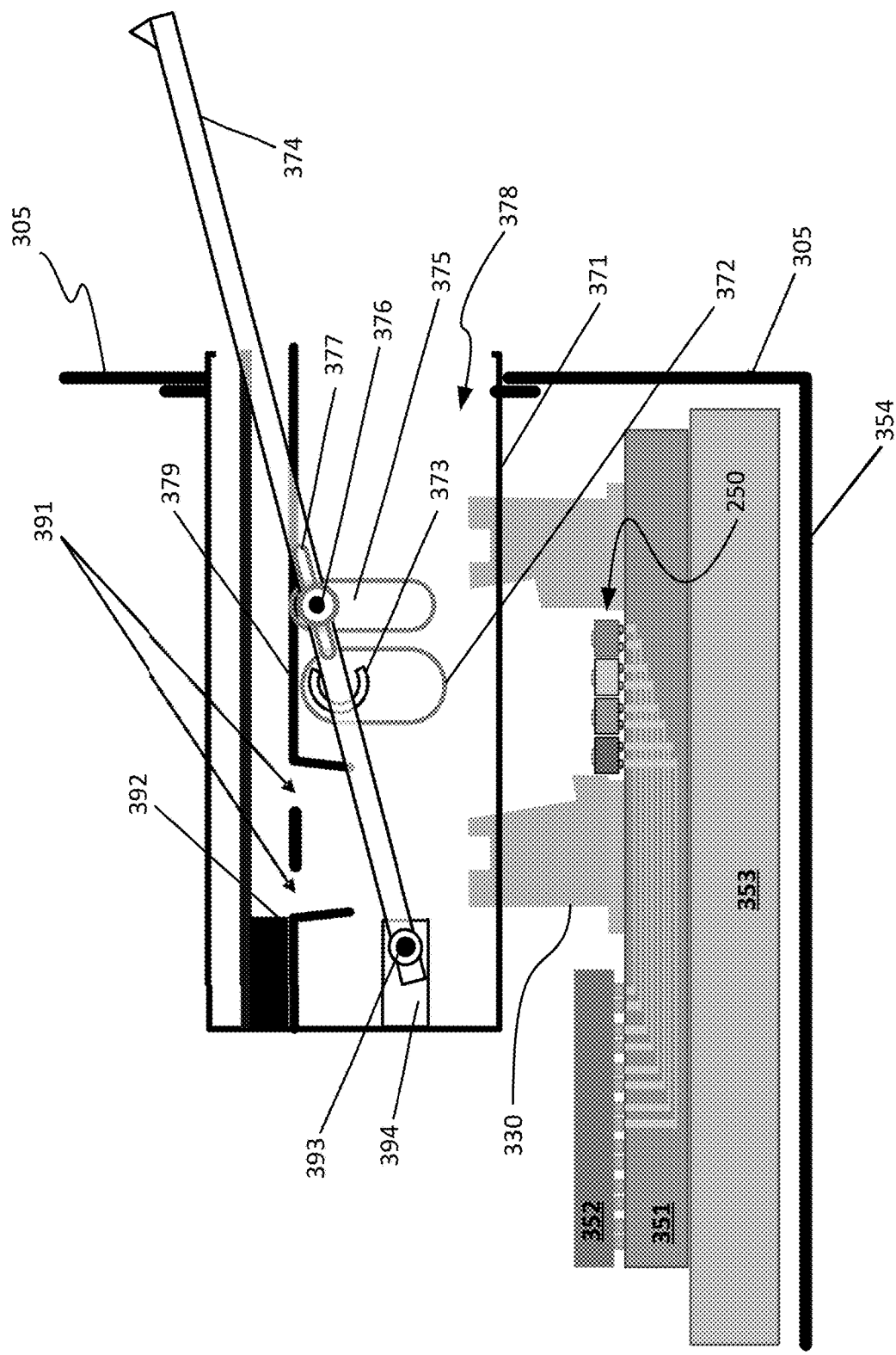
FIG. 3B illustrates an example configuration for the receptacle assembly shown in FIG. 3A, in accordance with an embodiment of the technology disclosed herein.
Figure 3C:
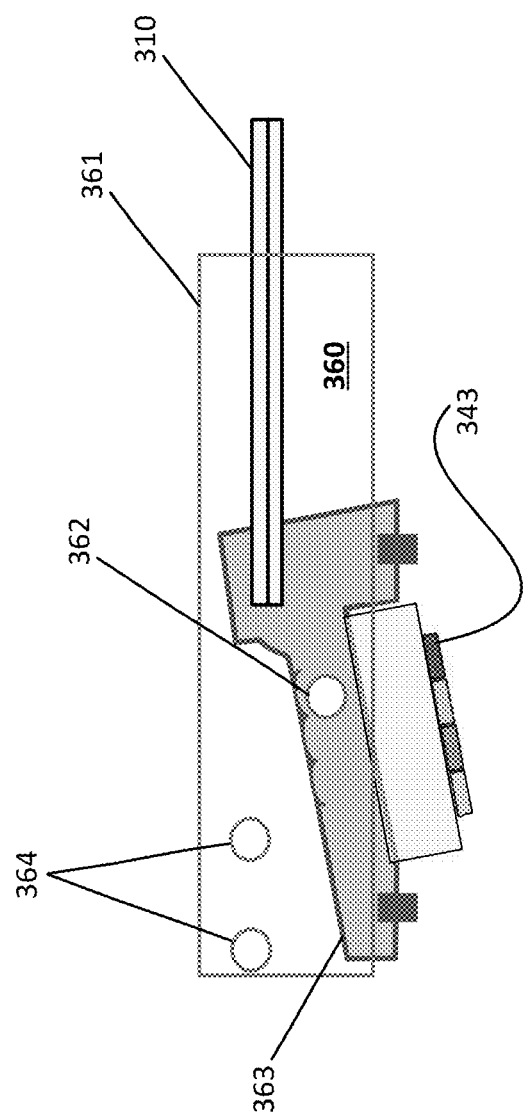
FIG. 3C illustrates an example configuration for the plug assembly shown in FIG. 3A, in accordance with an embodiment of the technology disclosed herein.
Figure 4:
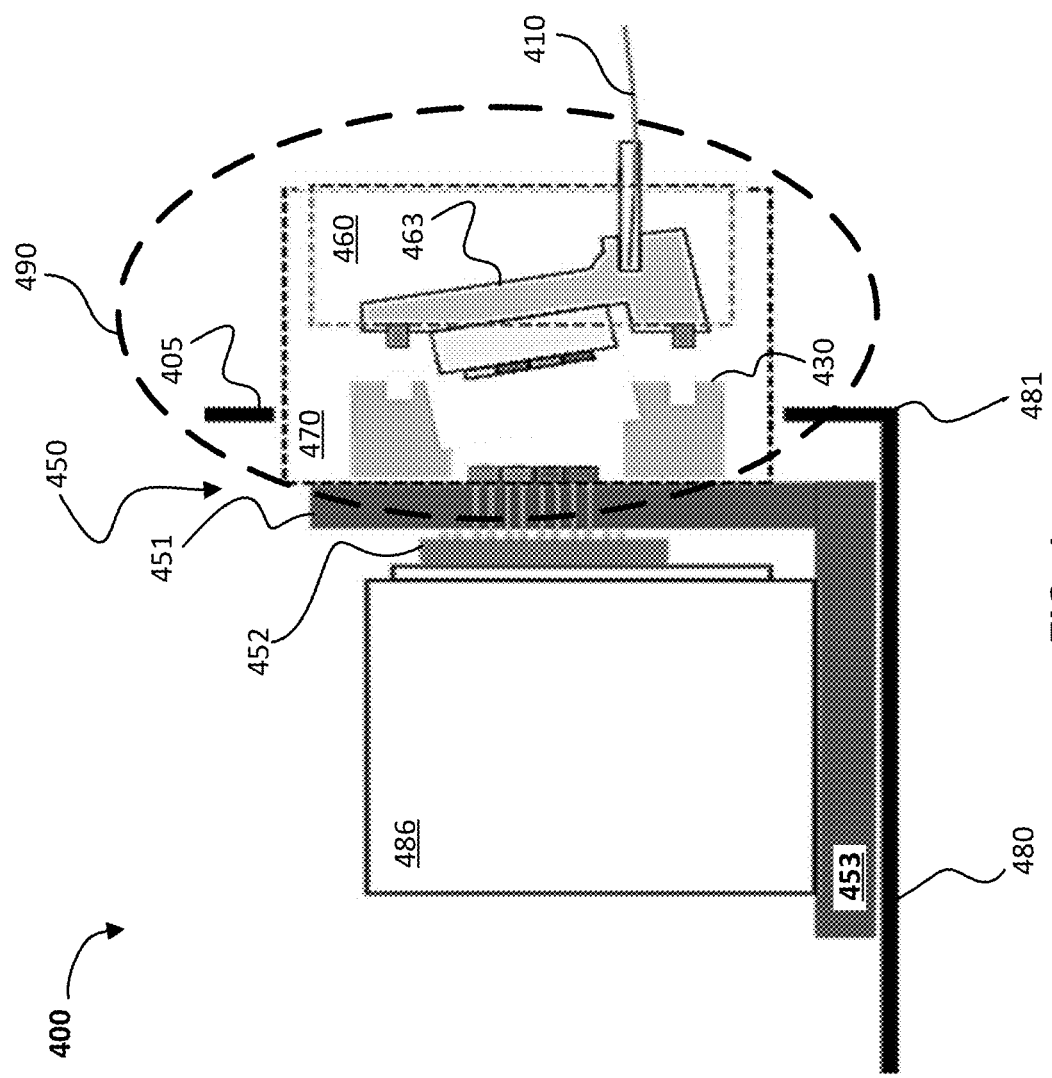
FIG. 4 illustrates another example configuration of a pluggable optical transceiver module including an adaptor for a direct opto-mechanical connection to an optical socket, where the module and adaptor are particularly oriented, in accordance with an embodiment of the technology disclosed herein.

An example configuration for the adaptor (shown in FIG. 2) and the particular components included therein are shown in FIGS. 3A-3C. Referring now to FIG. 3A, the plug assembly 360 is shown in a position outside of the receptacle assembly 370. Further, the receptacle assembly 370 is stably situated on top of the optical socket 330, in order to act as a mechanical contact to the optical socket 330. The receptacle assembly 370 can remain in this position while the plug assembly 360 is being installed.

As an example, prior to installing the plug assembly 360 inside of the receptacle assembly 370, the plug assembly 360 may be aligned (with respect to a horizontal X-axis) with the receptacle assembly 370. As seen in FIG. 3A, a front surface of the plug assembly 360 (e.g., at the opposing end of the optical fiber 310) is positioned to the height of an opening 378. The opening 378 can be an aperture, or hole, which allows entry into the internal area of receptacle assembly 370, particularly for installing the plug assembly 360. The plug assembly 360 is aligned to this opening 378 so that it is in prime position to be pushed forward (along the horizontal X-axis) into the opening 378 and inside of a frame, or cage 371, of the receptacle assembly 370. Installing the plug assembly 370 is described in greater detail below in reference to FIGS. 3D-3F.

In FIG. 3B, the components that comprise the receptacle assembly 370 in the example configuration are prominently shown. As alluded to above, the receptacle assembly 370 can have a body, or cage 371. The cage 371 can be a structure that is generally rectilinear in geometry that serves as a frame around the perimeter of the receptacle assembly 370 and housing its internal components inside of the internal area of the assembly 370.

The receptacle assembly 370 can be designed to include mechanical guides and securing mechanisms that assist in inserting, aligning, and stably retaining the plug assembly (shown in FIG. 3C) within the receptacle assembly 370. In the illustrated example, the receptacle assembly 370 includes: a plug housing grab hook 373 to engage the plug assembly once fully inserted; a cage slot 372 to clear the plug housing grab hook 373 to enter inside the cage 371; plug housing guide pin drop wells 391, and a plug housing guide rail 379. The guides 379, 391 in concert with a plug housing stop 392 provide secure and precise positioning of the plug assembly within the receptacle assembly 370. The receptacle assembly 370 also includes movement mechanisms, such as a lever 374. The lever 374 can be located outside of the receptacle assembly 370, being affixed to a side external surface of the cage 371. The receptacle assembly 370 can also include a lever guide slot 375, lever guide pin 376, and lever guide pin rail 377 for aligning and/or guiding movement of the lever 374 during operation. Also, the receptacle assembly 370 can include a lever pivot 393 and a lever pivot rest 394 to effectuate movement at the proximal end, and prohibit movement of the lever 374 at the distal end where the lever 374 is pivoted with the lever pivot 393.

Referring now to FIG. 3C, an example configuration for the plug assembly 360 and its components are prominently shown. As seen, the plug assembly 360 has a plug housing 361, which serves as a frame surrounding the internal components. In the example, the plug housing 360 is primarily rectilinear in geometry, similar to the shape of the receptacle assembly (shown in FIG. 3B) but having generally smaller dimensions. The plug housing 361 can house the optical plug connector 363 inside. Additionally, the plug assembly 360 can be configured to include alignment features, such as a plug housing grab pin 362 and plug housing guide pins 364 to guide the plug assembly 360 to be properly aligned, installed, and securely held within the receptacle assembly. The plug assembly 360 is designed to protect ferrules and optical filters from user handling and dust. In one example, the plug assembly 360 may be covered with a sleeve (not shown). In another example, the plug assembly 360 may include a mechanical component that functions as a "shutter" (not shown) that opens/slides when the connector is inserted.

Figure 3D:
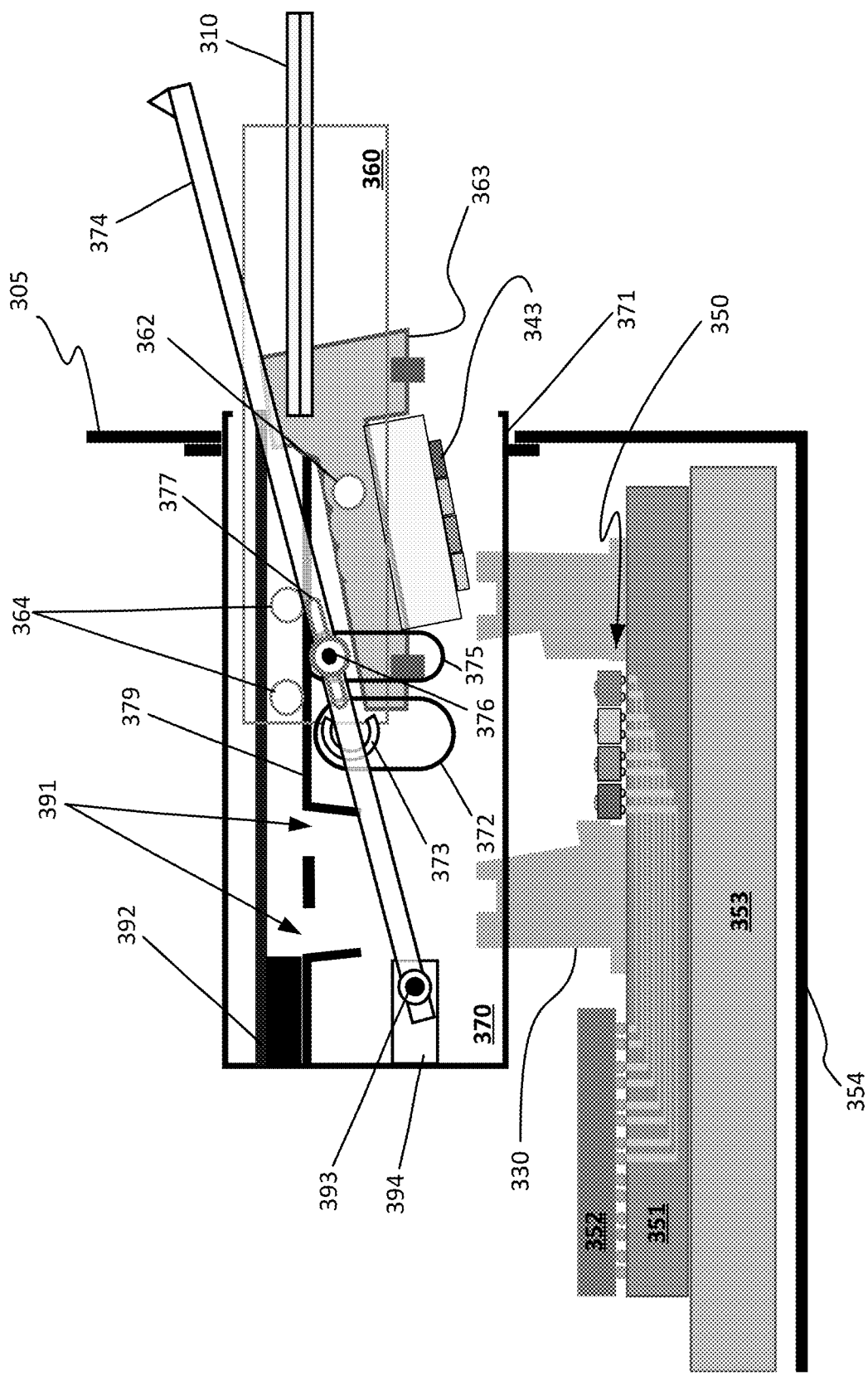
FIG. 3D illustrates an example position for the plug assembly shown with respect to installation within the receptacle assembly, in accordance with an embodiment of the technology disclosed herein.
Figure 3E:
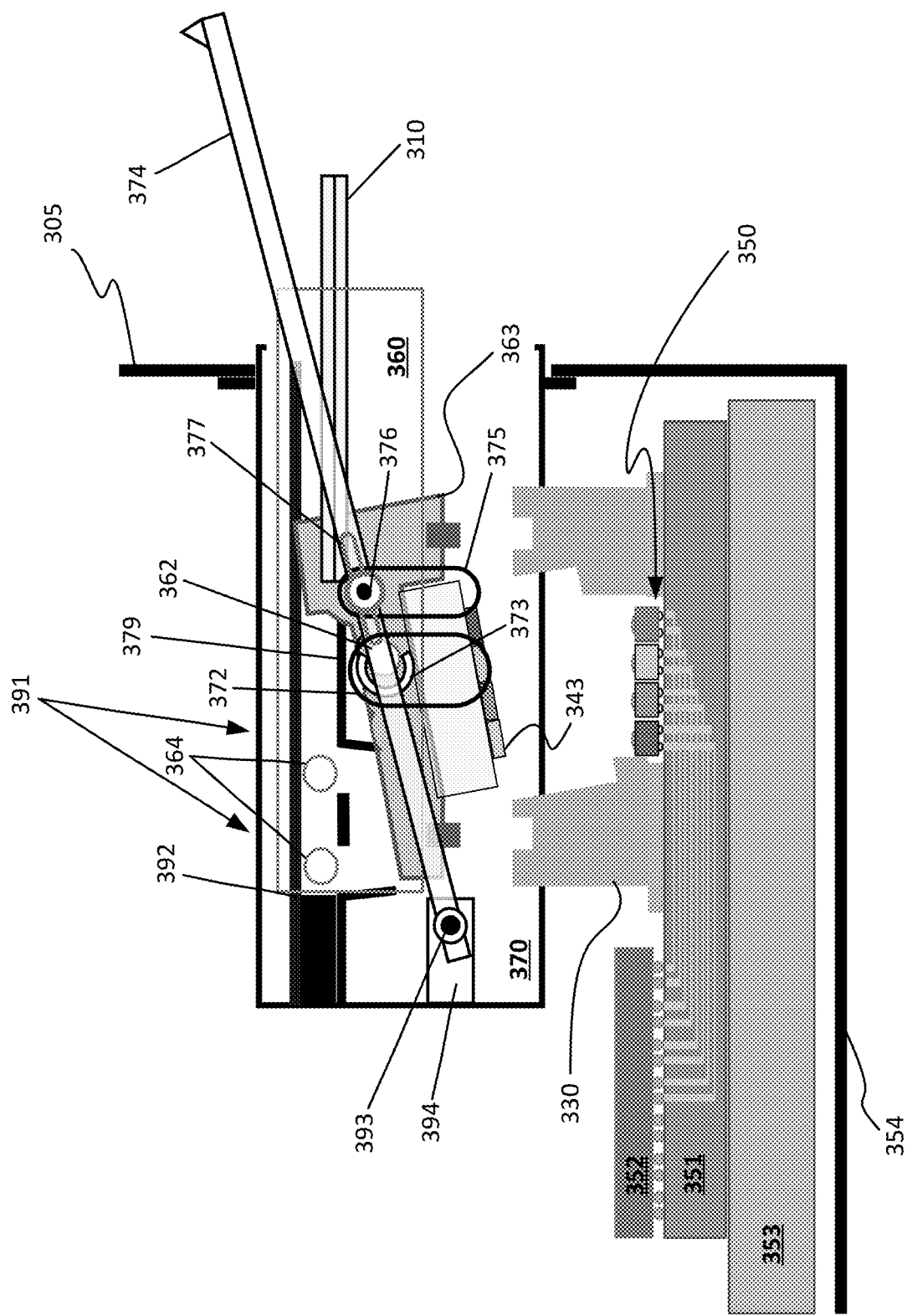
FIG. 3E illustrates yet another example position for the plug assembly with respect to installation within the receptacle assembly, in accordance with an embodiment of the technology disclosed herein.
Figure 3F:
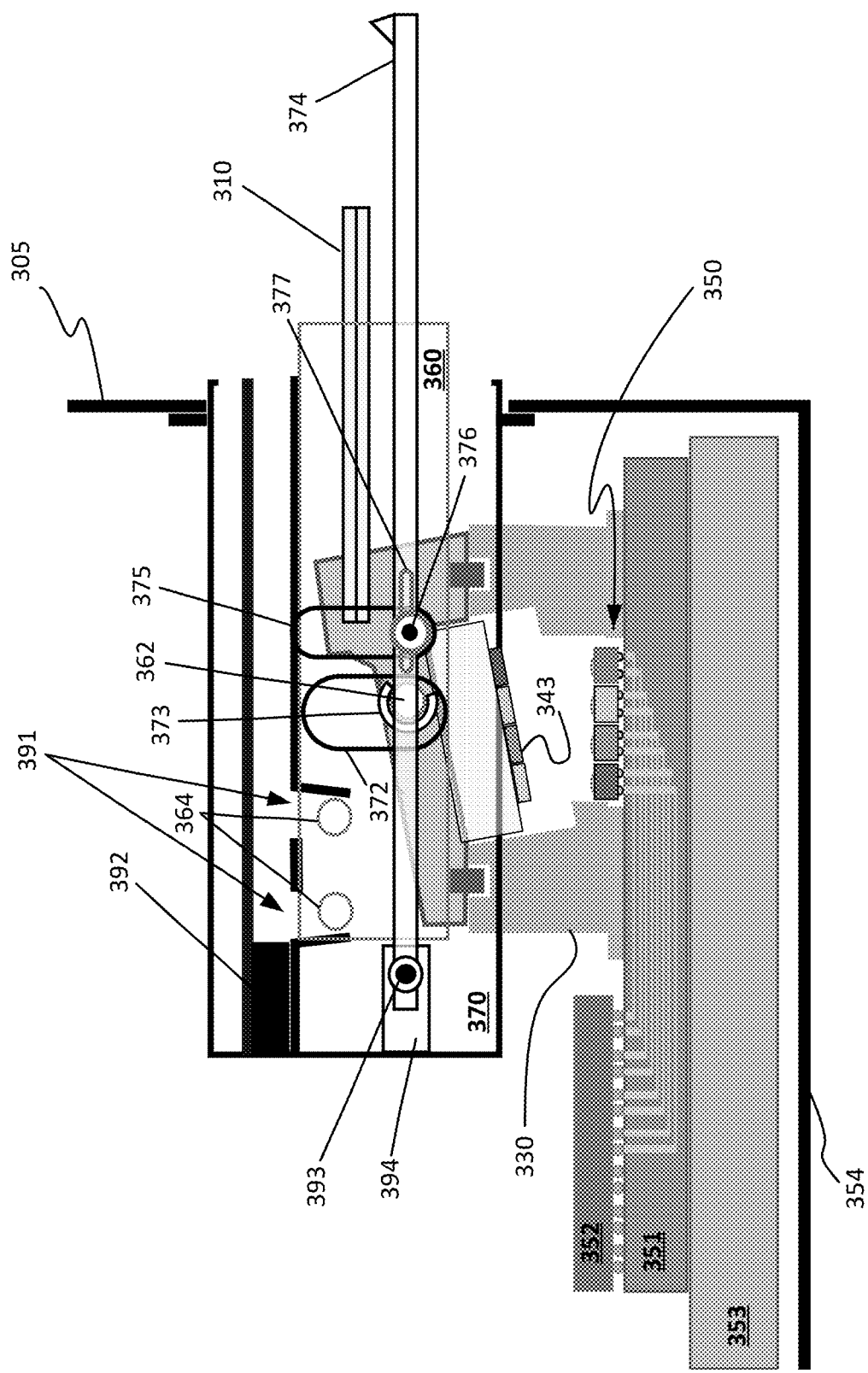
FIG. 3F illustrates another example position for the plug assembly with respect to seating with an optical socket, in accordance with an embodiment of the technology disclosed herein.

FIGS. 3D-3F illustrate examples of positions that the plug assembly 360 can be arranged while being installed inside of the receptacle assembly 370, and subsequently while the plug assembly 360 is being seated to the optical socket 330 (the FIGS. 3D-3F are shown in progression with respect to installing the plug assembly 360).

In FIGS. 3D-3F, it is particularly shown how the mechanical guides of the receptacle assembly 370 are employed so that there will be adequate mechanical alignment to engage the optical plug connector 263 with the optical socket 330. The receptacle assembly 370, using the plug movement mechanism, namely the lever 374, to operate the plug assembly 360 to travel along the vertical direction in order to engage with the optical socket 330. The lever 374 can be pivoted at the lever pivot 393 at a distal end of the receptacle assembly 370.

Referring now to FIG. 3E, the plug assembly 360 is shown in a position where it is installed, and pushed further forward (along the horizontal X-axis) inside of the receptacle assembly 370 (in comparison to FIG. 3D). Also, a point on the lever 374 may contact with a protruding push-down point on the plug assembly 360. For example, the push-down point is when 376 is captured within 373. The forward movement of the plug assembly 360 inside of the receptacle assembly 370 can be stopped (indicating that the plug assembly 360 is in proper alignment along the X-axis) when the front surface of the plug assembly 360 rests against the plug housing stop 392. Thus, this position can be considered as the plug assembly 360 being fully horizontally aligned inside of the receptacle assembly.

This position in FIG. 3E also illustrates the mechanical alignment features of the plug assembly 360 interacting with the alignment features of the receptacle assembly 370. For instance, the plug housing grab pin 362 of the plug assembly 360 can slide into an opening of the plug housing grab hook 373 to hold and secure the plug assembly 360 in that position. Additionally, the plug housing grab pins 364 of the plug assembly 360 is aligned with the plug housing grab pin drop wells 391 of the receptacle assembly 370, in order to secure the plug assembly 360 into a position of proper alignment (along the vertical Y-axis) with the optical socket 330.

In FIG. 3F, the plug assembly 360 can then be placed in a lowered position (along the vertical Y-axis) once installed inside of the receptacle assembly 370 (in comparison to FIG. 3D). This position in FIG. 3E can be considered the final position of installation, where the plug assembly 360 is positioned on top of the optical socket 330 for direct contact, such that the plug assembly 360 is mechanically and optically connected thereto. During installation, when the proximal end of the lever 374 is pushed downward, the lever 374 in turns applies pressure on the protruding push-down point on the plug assembly 360 and forces the plug assembly 360 to travel downward (along the vertical Y-axis) to engage with the optical socket 330. The plug housing guide pin drop wells 391 within the receptacle assembly 370 and the plug housing guide pins 364 on the plug assembly 360 may be implemented for the plug assembly 360 to travel downward with tight enough tolerances to properly engage with the optical socket 330. Thus, when the optical plug connector 363 is seated in the optical socket 330, the micro-optics of the optical plug connector 363 will precisely align with the opto-electronics within the optical socket 330, ensuring good performance of the optical transceiver 350. The aforementioned process is reversed to disengage the plug assembly 360 from the optical socket 330 when the lever 374 is moved in the upward direction (opposite to the downward direction).

In FIG. 4, another example of a pluggable optical transceiver module 400 implementing a direct opto-mechanical connection between an external fiber cable 410, terminated with the optical plug connector 463, and an optical socket 430 is illustrated. In this example, the pluggable optical transceiver module 400 is particularly arranged, where the opto-electronic components of the optical transceiver 450 are vertically oriented. In other words, the transceiver board 451 extends substantially vertically upward from the system board 480 in a manner that now orients the transceiver board 451 (including the optical socket 430) parallel to the faceplate 405. In an example, the transceiver board 451 may extend from the system board 480 by means of a flexible circuit portion at the position 481 of a high-speed rigid flex board 480, 451. In another example, the transceiver board 451 may be installed on a vertical header (not shown) disposed at the position 481 on the system board 480. The module 400 also incorporates an adaptor 490 that is substantially similar to the adaptor previously described in reference to FIG. 2 enabling a direct opto-mechanical connection from the external fiber cable 410 to the optical socket 430, in accordance with an embodiment of the technology disclosed herein. Accordingly, the faceplate receptacle 470, plug assembly 460, and an optical plug connector 463 (and the respective functions) of the adaptor 490 are not described again in detail for purposes of brevity. In some embodiments, the mechanisms to engage the optical plug connector 463 housed in the optical plug assembly 460 with the optical socket 430 may be simpler than those described previously with reference to FIG. 2.

As shown, the opto-electronics of the CWDM optical transceiver 450 and the ASIC 452 can be oriented on opposite sides of the transceiver board 451 (e.g., a high-speed rigid flex). In the illustrated example, the ASIC 452 is situated at the bottom (e.g., to the left) of the transceiver board 451, while the opto-electronics of the CWDM optical transceiver 450 and the optical socket 430 are situated at the top (e.g., to the right) of the transceiver board 451. Thus, the ASIC 452 and the opto-electronics of the CWDM optical transceiver 450 are predominantly horizontally aligned with each other, which minimizes the electrical trace length from the ASIC 452 to the opto-electronics of the CWDM optical transceiver 450 in this configuration of the pluggable optical transceiver module 400 (as compared to the previous configurations shown in FIG. 1A and FIG. 2). Further, in this configuration, a primarily flat and horizontally oriented system board 453 can be included and orthogonally attached to the transceiver board 451 (e.g., forming an approximate right angle). This geometry allows the system board 453 to serve as a base for the vertically oriented transceiver board 451. That is, the system board 453 is oriented parallel to the chassis base pan 480 (in the horizontal plane), which allows the elements that are attached to the transceiver board 451 to be securely mounted to the chassis base pan 480 via its base, namely system board 453. As alluded to above, in this orientation the CWDM optical transceiver 450 and optical socket 430 are now vertically parallel to the faceplate 405, which allows the adaptor 490 to mate with the socket 430 in a predominantly vertical (or upright) orientation as opposed to a horizontal (or downward) orientation used to mate these elements in previous configurations (shown in FIG. 2 and FIG. 1A). Restated, the receptacle assembly 470 can be inserted into the faceplate 405 where the optical plug connector 463 is primarily upright.

FIG. 4 also illustrates that the pluggable optical transceiver module 400 can include a cooling element in this configuration, shown as heat sink 486. As seen, the ASIC 452 can be coupled to the heat sink 486. Also, it should be appreciated that the system board 453 and the transceiver board 451 do not have to be arranged in a monolithic assembly and at substantially right angle orientation, and that this vertical orientation can be achieved using a rigid-flex circuit or a connector between a separate the transceiver board 451 and system board 453.

Figure 5:
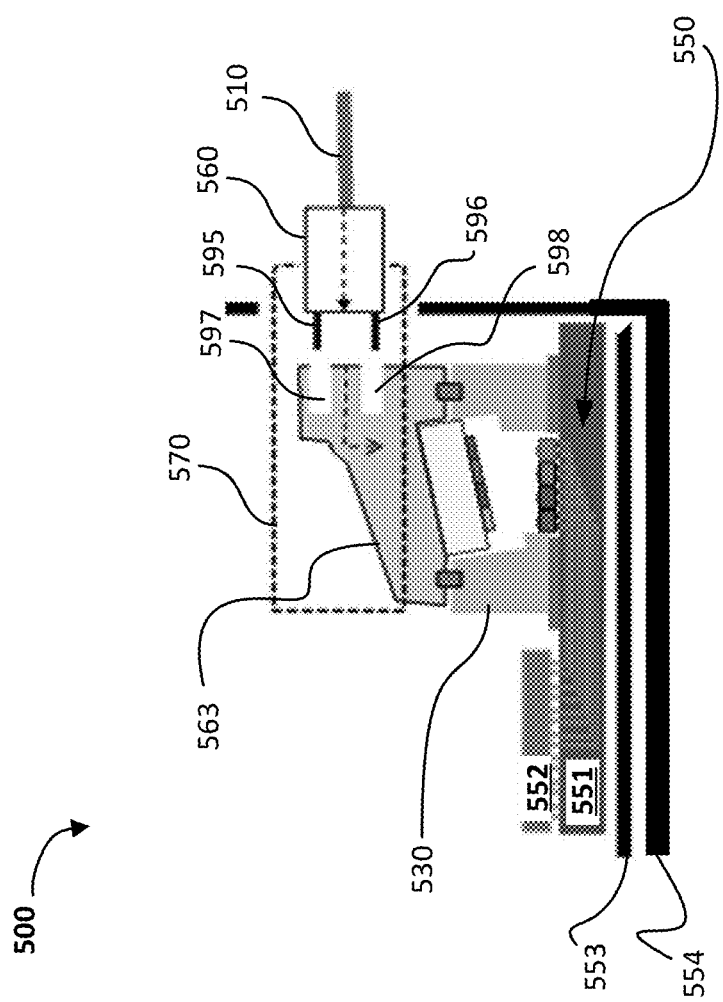
FIG. 5 illustrates another example of a pluggable optical transceiver module including a receptacle assembly for a direct opto-mechanical connection between a plug assembly (e.g., multi-fiber push on (MPO) connector) and an optical socket, in accordance with an embodiment of the technology disclosed herein.

Referring now to FIG. 5, yet another example of a pluggable optical transceiver module 500 including a receptacle assembly 570 (represented by dashed box) and plug assembly 560 is shown. According to the embodiments, the receptacle assembly 570 includes the optical plug connector 563 physically attached to the optical socket 530 and enables a direct opto-mechanical connection between plug assembly 560 (e.g., MPO connector) and the optical plug connector 563. As a general description, the receptacle assembly 570 can be configured to implement an opto-mechanical connection with the plug assembly 560 using either 1) physical mechanical mechanisms (e.g., directly attach optical plug connector 563 to the MPO connector), or 2) optical mechanisms (e.g., an expanded beam lens MPO connector coupled to an expanded beam lens of optical plug connector 563).

Although a different type of interface is formed in FIG. 5 than previously described (shown in FIG. 2 and FIG. 3), the receptacle assembly 570 and plug assembly 560 still precludes the use of a fiber jumper in the pluggable optical transceiver module 500.

In the embodiment, the receptacle assembly 570 can include mating features that are added to the optical plug connector 563 of the receptacle assembly 570 (e.g., pins and/or holes). The mating features of the optical plug connector 563 allow it to physically and directly mate with the plug assembly 560, which can be a standard MPO connector in this case. In the illustrated example of FIG. 5, the optical plug connector 563 has mating holes 597, 598 that are positioned in order to receive pins 595, 596 of the plug assembly 560, respectively, ensuring that the plug assembly 560 and the optical plug connector 563 are properly aligned and securely coupled. The pins 595, 596 extend from the mating side of the plug assembly 560, and can be inserted into the complimentary mating holes 597, 598 of the optical plug connector 563. Conventional optical plug connectors are designed to be on-board (e.g., inside of the system architecture) in a manner that does not typically require the connectors to have specialized mating features, such as long pins or deep holes. However, the optical plug connector 563 can include these type of mating features as illustrated. For example, the plug assembly 560 provides elongated pins 595, 596 that mate with complementary holes on the optical plug connector 563 of the receptacle assembly 570. Also, as shown, the external fiber cable 510 terminates at the plug assembly 560. As a result, this configuration does not require that standard MPOs be replaced in the module 500, and may be optimal in practical applications where maintaining use of MPO connectors is desirable.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
    a transceiver board;
    opto-electronics of an optical transceiver coupled to the transceiver board;
    an optical socket coupled to the transceiver board, wherein the optical socket enables an opto-mechanical interface with the opto-electronics of the optical transceiver; and
    an adaptor coupled to the optical socket in a manner that forms a direct opto-mechanical interface between an external fiber and the optical socket and enabling the opto-electronics of the optical transceiver to transmit and receive optical signals via the external fiber connector, wherein the adaptor comprises:
        a plug assembly housing an optical plug connector having the external fiber terminated thereto, wherein the optical plug connector comprises micro-optics of the optical transceiver; and
        a receptacle assembly inserted into a faceplate of the system and mechanically coupled to the optical socket, wherein the receptacle assembly receives the plug assembly such that the optical plug connector is mechanically coupled to the optical socket.

2. The system of claim 1, wherein mechanically coupling the optical plug connector to the optical socket forms a direct opto-mechanical interface between the external fiber and the optical socket.

3. The system of claim 2, wherein mechanically coupling the optical plug connector to the optical socket optically couples the micro-optics in the optical plug connector to the opto-electronics of the optical transceiver.

4. A system comprising:
    a vertically oriented transceiver board;
    opto-electronics of an optical transceiver coupled to the vertically oriented transceiver board such that the opto-electronics are parallel with the vertically oriented transceiver board;
    an optical socket coupled to the vertically oriented transceiver board such that the optical socket is parallel with the vertically oriented transceiver board, wherein the optical socket enables an opto-mechanical interface with the opto-electronics of the optical transceiver; and
    an adaptor coupled to the optical socket in a vertical orientation and in a manner that forms a direct opto-mechanical interface between an external fiber and the optical socket, wherein the adaptor comprises:
        a plug assembly housing an optical plug connector having the external fiber terminated thereto, wherein the optical plug connector comprises micro-optics of the optical transceiver; and
        a receptacle assembly inserted and vertically oriented into a faceplate of the system and mechanically coupled to the optical socket, wherein the receptacle assembly receives the plug assembly in a vertical orientation such that the optical plug connector is parallel with the vertically oriented optical socket.

5. The system of claim 4, wherein the receptacle assembly receives the plug assembly such that the optical plug connector is mechanically coupled to the optical socket.

6. The system of claim 5, wherein the receptacle assembly receives the plug assembly such that the optical plug connector is optically coupled to the optical socket and enabling the opto-electronics of the optical transceiver to transmit and receive optical signals via the external fiber.

7. The system of claim 4, further comprising:
    a faceplate coupled to a base pan in vertical orientation such that the faceplate is parallel to the transceiver board, the opto-electronics of the optical transceiver, and the optical socket, wherein the faceplate receives the receptacle assembly.

8. The system of claim 4, further comprising:
an application specific integrated circuit (ASIC) is coupled to a surface of the transceiver board, wherein the opto-electronics of the optical transceiver and the optical socket are coupled to an opposing surface of the transceiver board.

9. A system comprising:
a transceiver board;
opto-electronics of an optical transceiver coupled to the transceiver board;
an optical socket coupled to the transceiver board, wherein the optical socket enables an opto-mechanical interface with the opto-electronics of the optical transceiver;
a plug assembly having an external fiber terminated thereto; and
a receptacle assembly comprising an optical plug connector and mechanically coupled to the optical socket, wherein the receptacle assembly receives the plug assembly such that the plug assembly directly mechanically couples to the optical plug connector.

10. The system of claim 9, wherein the optical plug connector mechanically couples to the optical socket in a manner that forms a direct opto-mechanical interface between the external fiber and the optical socket.

11. The system of claim 10, wherein the plug assembly comprises mating pins.

12. The system of claim 11, wherein the optical plug connector comprises mating holes, the mating holes receiving the mating pins of the plug assembly to directly mechanically couple the plug assembly to the optical plug connector.

13. The system of claim 10, wherein forming the direct opto-mechanical interface between the external fiber and the optical socket enables the opto-electronics of the optical transceiver to transmit and receive optical signals via the external fiber.

* * * * *